Patented Apr. 9, 1929.

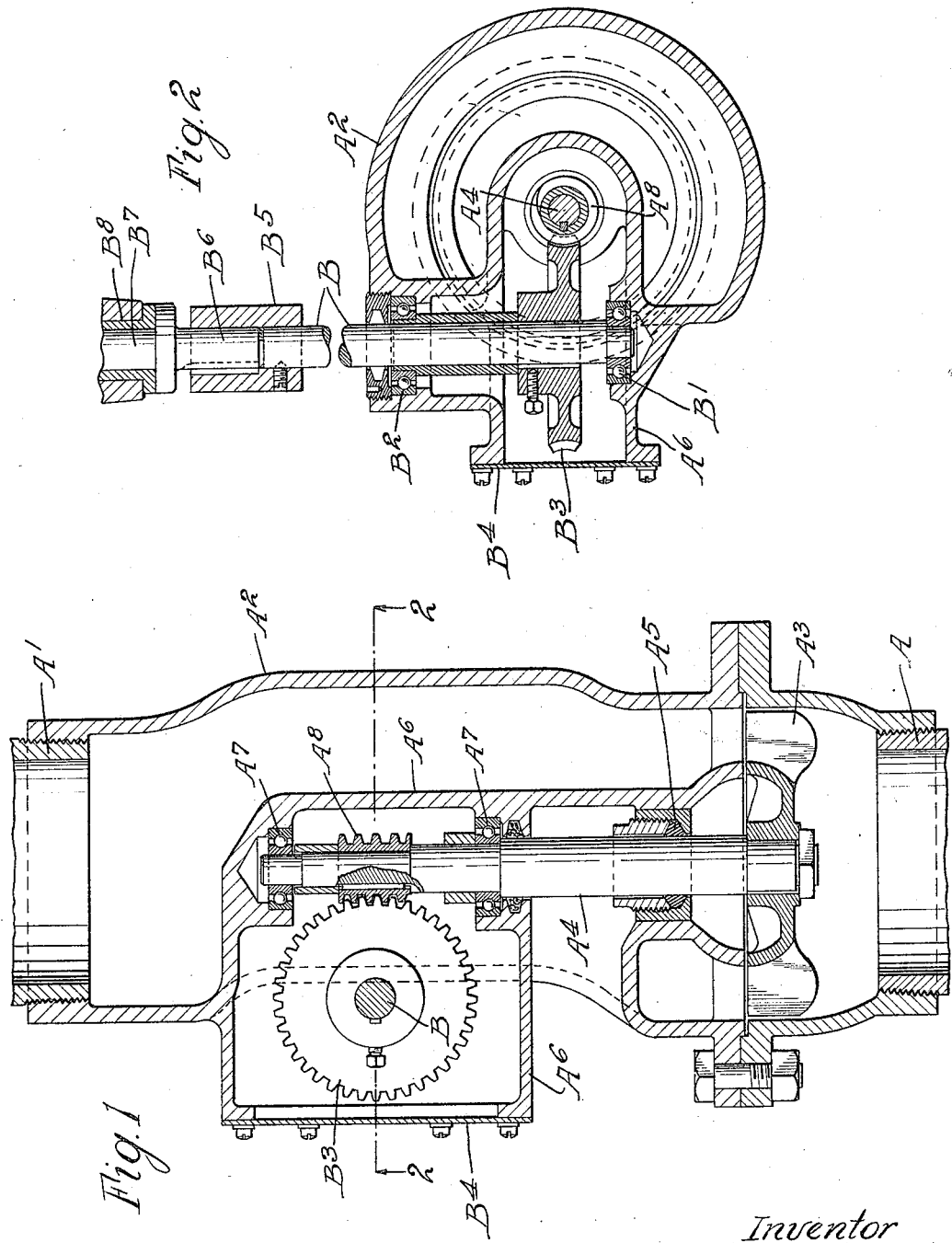

1,708,086

UNITED STATES PATENT OFFICE.

WILSON EVANS, OF CHICAGO, ILLINOIS, ASSIGNOR, BY MESNE ASSIGNMENTS, TO NATIONAL ALUMINATE CORPORATION, OF CHICAGO, ILLINOIS, A CORPORATION OF DELAWARE.

TURBINE.

Original application filed October 7, 1927, Serial No. 224,596. Divided and this application filed March 16, 1928. Serial No. 262,302.

My invention relates to improvements in turbines and concerns itself especially with turbines such as are primarily adaptable for use in connection with water treating and other chemical processes though the turbine is equally applicable to general purposes.

I have illustrated my turbine as applied to a water treating plant and described certain parts of that plant to more clearly point out the usefulness of the turbine. This application is a division of my co-pending application Serial Number 224,596, filed October 7, 1927.

My invention is illustrated more or less diagrammatically in the accompanying drawings, wherein—

Figure 1 is a longitudinal section through a part of the water line and associated parts on a horizontal plane;

Figure 2 is a section along the line 2—2 of Figure 1.

Like parts are indicated by like characters throughout the specification and drawings.

A is a supply pipe through which water on its way to the tank is fed by pump, gravity or other suitable means. $A^1$ is the discharge pipe which leads water onto the treating tank. $A^2$ is a turbine housing interposed between the pipes A $A^1$ and through which the water passes as it travels along those pipes. $A^3$ is a turbine rotor driving a shaft $A^4$ which in this case is arranged parallel with the axis of flow of the fluid. $A^5$ is a packing gland through which the shaft $A^4$ projects beyond the turbine. $A^6$ is a housing containing bearings $A^7$ $A^7$ for the shaft $A^4$. Between these bearings on the shaft is a worm $A^8$.

B is a vertical shaft extending across the housing $A^6$ supported by anti-friction bearings $B^1$ $B^2$ and carrying a worm wheel $B^3$ in mesh with the worm $A^8$. $B^4$ is a cover plate for the housing $A^6$. The shaft B carries at its upper end the socket $B^5$ in which is splined the free end $B^6$ of a miter gear shaft $B^7$ which shaft is rotatably mounted in a bearing $B^8$ in the speed reduction housing $B^9$ and carries the miter gear $B^{10}$.

I claim:

1. A turbine comprising a housing, a rotor therein, supply and discharge pipes at either end of the housing, substantially in line with the axis of the rotor and of substantially the same diameter as the housing and a pocket formed in the wall of the housing and extending thereinto in line with the rotor, a shaft extending through the wall of the pocket to carry the rotor, bearings for the shaft contained within the pocket, one of said bearings located at the end of the shaft furthest from the rotor, a packing gland associated with the shaft adjacent the rotor and a bearing intermediate the gland and the first mentioned bearing, the shaft being exposed between the gland and the bearing.

2. A turbine comprising a housing, a rotor therein, supply and discharge pipes at either end of the housing, substantially in line with the axis of the rotor and of substantially the same diameter as the housing and a pocket formed in the wall of the housing and extending thereinto in line with the rotor, a closed gear case formed partially within the pocket and projecting outwardly beyond the housing, a rotor shaft located within the pocket and contained partially within the gear case, bearings therefor in the case, the shaft extending beyond the gear case through one wall of the pocket into the turbine housing and at the end thereof carrying the rotor.

3. A turbine comprising a housing, a rotor therein, supply and discharge pipes at either end of the housing, substantially in line with the axis of the rotor and of substantially the same diameter as the housing and a pocket formed in the wall of the housing and extending thereinto in line with the rotor, a gear case formed partially within the pocket and projecting outwardly beyond the housing, a rotor shaft located within the pocket and contained partially within the gear case, bearings therefor in the case, the shaft extending beyond the gear case through one wall of the pocket into the turbine housing and at the end thereof carrying the rotor, a worm on the shaft between the bearings, a worm wheel in the gear case in mesh with the worm and a power transmitting shaft upon which the worm wheel is mounted.

4. A turbine comprising a housing, a rotor therein, supply and discharge pipes at either end of the housing, substantially in line with the axis of the rotor and of substantially the same diameter as the housing and a pocket formed in the wall of the housing and extending thereinto in line with the rotor, a gear case formed partially within the pocket and projecting outwardly beyond the housing, a rotor shaft located within the pocket and contained partially within the gear case, bearings therefor in the case, the shaft extending beyond the gear case through one wall of the pocket into the turbine housing and at the end thereof carrying the rotor, a worm on the shaft between the bearings, a worm wheel in the gear case in mesh with the worm and a power transmitting shaft upon which the worm wheel is mounted, bearings in the gear case wall for the power shaft.

5. A turbine comprising a generally cylindrical housing, a pocket formed integral with the wall thereof and projecting thereinto, a rotor in the housing, a rotor shaft in the pocket extending through the wall thereof to carry the rotor, a gear case integral with the housing and pocket and projecting laterally from the housing beyond the pocket, there being a space between one wall of the gear case and the end wall of the pocket adjacent the rotor.

6. A turbine comprising a generally cylindrical housing, a pocket formed integral with the wall thereof and projecting thereinto, a rotor in the housing, a rotor shaft in the pocket extending through the wall thereof to carry the rotor, a gear case integral with the housing and pocket and projecting laterally from the housing beyond the pocket, there being a space between one wall of the gear case and the end wall of the pocket adjacent the rotor, a worm on the rotor shaft in the gear case, a worm wheel in mesh with the worm, and a power shaft upon which the wheel is mounted.

7. A turbine comprising a generally cylindrical housing, a pocket formed integral with the wall thereof and projecting thereinto, a rotor in the housing, a rotor shaft in the pocket extending through the wall thereof to carry the rotor, a gear case integral with the housing and pocket and projecting laterally from the housing beyond the pocket, there being a space between one wall of the gear case and the end wall of the pocket adjacent the rotor, a worm on the rotor shaft in the gear case, a worm wheel in mesh with the worm and a power shaft upon which the wheel is mounted, bearings for the rotor shaft and the power shaft located within the gear case.

8. A turbine comprising a generally cylindrical housing, a pocket formed integral with the wall thereof and projecting thereinto, a rotor in the housing, a rotor shaft in the pocket extending through the wall thereof to carry the rotor, a gear case integral with the housing and pocket and projecting laterally from the housing beyond the pocket, there being a space between one wall of the gear case and the end wall of the pocket adjacent the rotor, a packing gland in the wall of the pocket surrounding the shaft, the space between the gear case and the pocket walls being sufficient to permit access to the gland for adjustment.

Signed at Chicago, county of Cook, and State of Illinois, this 13th day of March, 1928.

WILSON EVANS.